(12) United States Patent
Tanaka et al.

(10) Patent No.: US 7,021,844 B2
(45) Date of Patent: Apr. 4, 2006

(54) PRINTING APPARATUS

(75) Inventors: Seiji Tanaka, Toyoshima-machi (JP); Hiroyasu Kurashina, Marsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/747,878

(22) Filed: Dec. 29, 2003

(65) Prior Publication Data

US 2004/0190965 A1   Sep. 30, 2004

(30) Foreign Application Priority Data

Jan. 30, 2003 (JP) ............................. 2003-022256

(51) Int. Cl.
*B41J 5/30* (2006.01)

(52) U.S. Cl. .......................... 400/61; 400/62; 400/70; 358/1.15

(58) Field of Classification Search ............... 400/613, 400/61–63, 70, 76; 358/1.15–1.18, 1.1, 1.2, 358/1.9
See application file for complete search history.

(56) References Cited

U.S. PATENT DOCUMENTS

| | | | |
|---|---|---|---|
| 5,492,420 A | | 2/1996 | Nunokawa et al. |
| 5,550,985 A | * | 8/1996 | Miller et al. ................ 713/324 |
| 5,847,693 A | * | 12/1998 | Shima ........................ 345/156 |
| 6,042,278 A | | 3/2000 | Spencer et al. ............... 400/61 |
| 6,396,591 B1 | * | 5/2002 | Harrington et al. ......... 358/1.13 |
| 6,549,962 B1 | * | 4/2003 | Emmert et al. ............... 710/65 |
| 6,557,965 B1 | * | 5/2003 | Walker et al. ................. 347/16 |
| 6,559,971 B1 | * | 5/2003 | Watts et al. .................. 358/1.2 |
| 6,761,493 B1 | * | 7/2004 | Hooper et al. ................ 400/61 |
| 2002/0130942 A1 | | 9/2002 | Walker et al. |
| 2002/0186392 A1 | * | 12/2002 | Ahne et al. ................ 358/1.13 |
| 2003/0011807 A1 | * | 1/2003 | Montierth et al. ......... 358/1.15 |
| 2003/0227528 A1 | * | 12/2003 | Hohberger et al. ......... 347/104 |

FOREIGN PATENT DOCUMENTS

| | | |
|---|---|---|
| CN | 1087583 | 6/1994 |
| JP | 59-055782 | 3/1984 |
| JP | 06-155866 | 6/1994 |
| JP | 08-282068 | 10/1996 |
| JP | 2002-036397 | 2/2002 |

OTHER PUBLICATIONS

Computer Translation of JP 08-282068.*

* cited by examiner

*Primary Examiner*—Minh Chau
(74) *Attorney, Agent, or Firm*—Hogan & Hartson, L.L.P.

(57) ABSTRACT

A printing apparatus includes a connection interface which connects the printing apparatus to a peripheral device such as a host computer. A connection object of the connection interface is detected, and a print mode is set to a normal print mode or a demonstration print mode. In the normal print mode, printing is performed based on print data received from the host computer, depending on the detected connection object. In the demonstration print mode, printing is performed based on demonstration print data which is stored in advance. The print mode is set to the normal print mode when the connection object is the host computer and to the demonstration print mode when the connection object is not the host computer or when there is no connection object.

26 Claims, 12 Drawing Sheets

⟨MODE SETTING CONDITIONS⟩

FIG. 5A

DEPENDING ON PRINT MEDIUM

| | CONDITION | MODE |
|---|---|---|
| T-1 | WHEN PRINT MEDIUM IS SPECIFIC (TAPE CARTRIDGE EXCLUSIVELY USED FOR DEMONSTRATION PRINTING) | DEMONSTRATION PRINT MODE |
| T-2 | WHEN PRINT MEDIUM IS SPECIFIC (TAPE CARTRIDGE EXCLUSIVELY USED FOR NORMAL PRINTING) | NORMAL PRINT MODE |

FIG. 5B

DEPENDING ON CONNECTION OBJECT

| | CONDITION | MODE |
|---|---|---|
| C-1 | WHEN CONNECTION OBJECT IS NOT HOST COMPUTER OR WHEN THERE IS NO CONNECTION OBJECT | DEMONSTRATION PRINT MODE |
| C-2 | WHEN CONNECTION OBJECT IS ATTACHMENT EXCLUSIVELY USED FOR DEMONSTRATION PRINTING | DEMONSTRATION PRINT MODE |
| C-3 | WHEN CONNECTION OBJECT IS HOST COMPUTER | NORMAL PRINT MODE |

FIG. 5C

DEPENDING ON CONNECTION OBJECT AND PRINT MEDIUM CONDITION

| | CONDITION | MODE |
|---|---|---|
| CT-1 | WHEN CONNECTION OBJECT IS HOST COMPUTER (IRRESPECTIVE OF LOADED PRINT MEDIUM) | NORMAL PRINT MODE |
| CT-2 | WHEN CONNECTION OBJECT IS ATTACHMENT EXCLUSIVELY USED FOR DEMONSTRATION PRINTING (IRRESPECTIVE OF LOADED PRINT MEDIUM) | DEMONSTRATION PRINT MODE |
| CT-3 | WHEN PRINT MEDIUM IS SPECIFIC PRINT MEDIUM (IRRESPECTIVE OF CONNECTION OBJECT) | DEMONSTRATION PRINT MODE |

CIRCUIT CONFIGURATION OF EXCLUSIVELY USED ATTACHMENT

PRINTING APPARATUS

BACKGROUND OF THE INVENTION

1. Field of the Invention

The present invention relates to a printing apparatus which performs printing based on print data sent from a host computer.

2. Description of the Related Art

There is conventionally known a printing apparatus (label writer) in which printing on a tape is performed based on print data or control data which is sent from a host computer and the tape is cut to have a predetermined length, thus creating a label (see Published Unexamined Japanese Patent Application No. 2002-036397, FIG. 1 and related description). This type of printing apparatus does not have a user interface on a printing apparatus case thereof for creating and editing data. Therefore, when conducting shipping inspections of products or performing demonstration printing in sales activities, printing has to be carried out by sending print data to the printing apparatus from the host computer after a printing apparatus driver and a print-only application are installed into the host computer, and thereafter the host computer and the printing apparatus are connected using a cable or the like.

Due to this, when performing demonstration printing, it is required to prepare a display, a keyboard, a cable and the like, in addition to the host computer in which the printing apparatus driver and the like are installed. Therefore, preparation thereof requires time and effort. In addition, in sales activities, it has been very inconvenient in that the host computer had to be carried around or a host computer with an operation system (OS) which corresponds to the printing apparatus had to be prepared by the customer.

SUMMARY OF THE INVENTION

In view of the above-described problems, the present invention has an advantage of providing a printing apparatus which is capable of performing demonstration printing easily without being connected to a host computer.

According to one aspect of the present invention, there is provided a printing apparatus which performs printing based on print data sent from a host computer and in which a user interface to be operated by a user is eliminated. The printing apparatus comprises: a connection interface which connects the printing apparatus to a peripheral device including the host computer; connection object detection means for detecting a connection object of the connection interface; mode setting means for setting a print mode to one of a normal print mode in which printing is performed based on the print data sent from the host computer, and a demonstration print mode in which printing is performed based on demonstration print data which is stored in advance; and demonstration printing means for performing demonstration printing on a print medium with a specific operation by the user serving as a trigger therefor when the print mode is set to the demonstration print mode. The mode setting means sets the print mode to the normal print mode when the connection object is the host computer and to the demonstration print mode when the connection object is not the host computer or there is no connection object.

According to this arrangement, when the connection object is not the host computer or there is no connection object, the print mode is set to the demonstration print mode and printing is performed based on the demonstration print data which is stored in the printing apparatus in advance.

Thus, the printing apparatus can perform demonstration printing easily without being connected to the host computer. In addition, the printing apparatus does not include a user interface to be operated by the user and performs the demonstration printing utilizing a specific operation by the user as a trigger for printing. Therefore, by sharing the specific operation with another operation (for example, an operation of supplying power), the user does not need to carry out a special operation (for example, depression of a print start key) in order to execute printing and thus the demonstration printing can be performed more easily. Further, since the printing apparatus can be constructed without the user interface, cost reduction can be realized. The user interface includes a key, dual inline package (DIP) switch, button and touch panel for executing functions to carry out printing, creating and editing print data.

Preferably, the connection object detection means detects the connection object when power is supplied.

According to this arrangement, the connection object can be detected and the print mode can be set to the demonstration print mode, based on an operation of supplying power which is inevitable for the user to allow the printing apparatus to execute printing. Namely, no special operation is required for mode setting, thus saving the user the trouble of carrying out the special operation.

Preferably, the connection object detection means detects the connection object when the print medium is loaded.

According to this arrangement, the connection object can be detected and the print mode can be set to the demonstration print mode, based on an operation of loading the print medium which is inevitable for the user to allow the printing apparatus to execute printing. Namely, no special operation is required for mode setting, thus saving the user the trouble of carrying out the special operation.

Preferably, the connection object detection means detects the connection object when the connection object is connected.

According to this arrangement, the connection object can be detected and the print mode can be set to the demonstration print mode, based on an operation of connecting the connection object which is considered necessary for the user to allow the printing apparatus to execute printing. Namely, no special operation is required for mode setting, thus saving the user the trouble of carrying out the special operation.

Preferably, the mode setting means sets the print mode to the demonstration print mode when the connection object is an attachment exclusively used for demonstration printing.

According to this arrangement, the print mode is set to the normal print mode when the connection object is the host computer and to the demonstration print mode when the connection object is the attachment exclusively used for demonstration printing. This simple construction thus enables the mode setting means to perform a process of detecting the connection object (process of setting the print mode) to be easily and surely performed.

Preferably, the specific operation includes an operation of supplying power.

According to this arrangement, demonstration printing can be performed based on the operation of supplying power which is inevitable for the user to allow the printing apparatus to perform printing. Namely, no special operation is required for executing the demonstration printing, thus saving the user the trouble of carrying out the special operation.

Preferably, the specific operation includes an operation of loading the print medium.

According to this arrangement, the demonstration printing can be performed based on the operation of loading the print medium which is inevitable for the user to allow the printing apparatus to perform printing. Namely, no special operation is required for executing the demonstration printing, thus saving the user the trouble of carrying out the special operation.

Preferably, the specific operation includes an operation of connecting the connection object.

According to this arrangement, demonstration printing can be performed based on the operation of connecting the connection object which is considered necessary for the user to allow the printing apparatus to perform printing. Namely, no special operation is required for executing demonstration printing, thus saving the user the trouble of carrying out the special operation.

Preferably, the print medium is a tape and the printing apparatus further comprises a tape cartridge mounting portion for mounting a tape cartridge having housed therein the tape in a state of being wound. The tape cartridge mounting portion has a lid member which is closed after the tape cartridge is mounted, and the connection object detection means detects the connection object when the lid member is closed.

According to this arrangement, closure of the lid member is detected after mounting the tape cartridge where the tape is housed. Thus, in comparison with a case in which the loading of the tape itself is detected, loading (mounting) of the print medium can be easily detected.

Preferably, the specific operation includes an operation of loading the tape cartridge.

According to this arrangement, the demonstration printing can be performed based on the operation of loading the tape cartridge which is inevitable for the user to allow the printing apparatus to perform printing. Namely, no special operation is required for executing the demonstration printing, thus saving the user the trouble of carrying out the special operation.

Preferably, the print medium is a discoid write-once optical disk.

According to this arrangement, the printing apparatus which performs printing on the discoid write-once optical disk medium, can perform demonstration printing easily without being connected to the host computer. The discoid write-once optical disk is defined as a compact disc (CD)-recordable (CD-R), CD-rewritable (CD-RW), digital versatile disk (DVD)-recordable (DVD-R), DVD-rewritable (DVD-RW), DVD random access memory (DVD-RAM), and the like.

According to another aspect of the present invention, there is provided a printing apparatus which performs printing based on print data sent form a host computer. The printing apparatus comprises: print medium detection means for detecting a type of a print medium loaded on the printing apparatus; mode setting means for setting a print mode to one of a normal print mode in which printing is performed based on the print data sent from the host computer, depending on the detected type of the print medium, and a demonstration print mode in which printing is performed based on demonstration print data which is stored in advance; and demonstration printing means for performing demonstration printing on the print medium with a specific operation by a user serving as a trigger therefor when the print mode is set to the demonstration print mode.

According to this arrangement, the type of print medium is detected, and the print mode is set to either the normal print mode or the demonstration print mode depending on the type of print medium. When the print mode is set to the demonstration print mode, printing is performed based on the demonstration print data which is stored in the printing apparatus in advance. Thus, the printing apparatus can perform demonstration printing easily without being connected to the host computer.

Preferably, the print medium detection means detects the print medium when power is supplied.

According to this arrangement, the print medium can be detected and the print mode can be set based on an operation of supplying power which is inevitable for the user to allow the printing apparatus to execute printing. Namely, no special operation is required for mode setting, thus saving the user the trouble of carrying out the special operation.

Preferably, the print medium detection means detects the print medium when the print medium is loaded.

According to this arrangement, the print medium can be detected and the print mode can be set based on an operation of loading the print medium which is inevitable for the user to allow the printing apparatus to execute printing. Namely, no special operation is required for mode setting, thus saving the user the trouble of carrying out the special operation.

Preferably, a user interface to be operated by the user is eliminated.

According to this construction, the user interface (for example, a print start key) to be operated by the user is eliminated, thus reducing the cost for providing the user interface on the printing apparatus case.

Preferably, the printing apparatus further comprises a print start key by which the user instructs an execution of printing, and the print medium detection means detects the print medium when the print start key is depressed by the user.

According to this arrangement, the print medium is detected and the print mode is set when the print start key is depressed by the user. Thus, the user does not set the print mode erroneously by an operation which the user does not intend to carry out (for example, the operation of supplying power).

Preferably, the specific operation includes an operation of depressing the print start key.

According to this arrangement, the demonstration printing is carried out by depressing the print start key serving as a trigger for detecting the print medium and setting the print mode. Thus the user can perform the processes by depressing the key once.

Preferably, the specific operation includes an operation of supplying power.

According to this arrangement, the demonstration printing can be performed based on the operation for supplying power which is inevitable for the user to allow the printing apparatus to execute printing. Namely, no special operation is required for the demonstration printing, thus saving the user the trouble of carrying out the special operation.

Preferably, the specific operation includes an operation of loading the print medium.

According to this arrangement, demonstration printing can be performed based on the operation for loading the print medium which is inevitable for the user to allow the printing apparatus to execute printing. Namely, no special operation is required for the demonstration printing, thus saving the user the trouble of carrying out the special operation.

In the above-described printing apparatus, preferably, the print medium is a tape and the printing apparatus further comprises: a tape cartridge mounting portion for mounting a tape cartridge having housed therein the tape in a state of being wound. The tape cartridge mounting portion has a lid member which is closed after the tape cartridge is mounted, and the print medium detection means detects the type of the tape cartridge when the lid member is closed.

According to this arrangement, the type of the tape cartridge having housed therein the tape is detected. Thus, the type of the print medium can be easily detected in comparison with a case where the type of the tape itself is detected. In addition, mounting of the tape cartridge is detected by closure of the lid member. Thus, the mounting of the tape cartridge is surely detected in comparison with a case where loading of the tape itself is detected.

Preferably, the specific operation includes an operation of closing the lid member.

According to this arrangement, demonstration printing can be performed based on an operation of closing the lid member which is inevitable for the user to allow the printing apparatus to execute printing apparatus. Namely, no special operation is required for executing the demonstration printing, thus saving the user the trouble of carrying out the special operation.

Preferably, the print medium is a discoid write-once optical disk.

According to this arrangement, the printing apparatus which performs printing on the discoid write-once optical disk can perform the demonstration printing easily without being connected to the host computer.

The above-described printing apparatus preferably further comprises a connection interface which connects the printing apparatus to a peripheral device including the host computer, and connection object detection means for detecting a connection object of the connection interface. When the connection object is the host computer, the mode setting means sets the print mode to the normal print mode irrespective of the loaded print medium.

According to this arrangement, when the connection object is the host computer, the print mode is set to the normal print mode irrespective of the loaded print medium. Thus, the demonstration printing is not executed against the user's intention even if the user unintentionally loads the print medium which is not exclusively used for the normal print mode (or the print medium dedicated to demonstration printing).

Preferably, when the connection object detected by the connection object detection means is an attachment exclusively used for demonstration printing, the mode setting means sets the print mode to the demonstration print mode irrespective of the loaded print medium.

According to this arrangement, when the connection object is an attachment exclusively used for demonstration printing, the print mode is set to the demonstration print mode irrespective of the loaded print medium. Thus, the demonstration printing can be executed even if the user unintentionally loads the print medium which is not exclusively used for the demonstration print mode (or the print medium exclusively used for normal printing).

Preferably, when the print medium detected by the print medium detection means is a specific print medium, the mode setting means sets the print mode to the demonstration print mode irrespective of the connection object detected by the connection object detection means.

According to this arrangement, when the detected print medium is a specific print medium, the print mode is set to the demonstration print mode irrespective of the connection object. Thus, demonstration printing can be executed even if the user unintentionally connects the printing apparatus to the host computer.

Preferably, the specific operation includes an operation of connecting the connection object.

According to this arrangement, demonstration printing can be performed based on the operation of connecting the connection object which is considered necessary for the user to allow the printing apparatus to execute printing. Namely, no special operation is required for executing the demonstration printing, thus saving the user the trouble of carrying out the special operation.

Preferably, after setting the print mode to the demonstration print mode, the mode setting means continues to set the print mode to the demonstration print mode until the power is turned off.

According to this arrangement, after the print mode is set to the demonstration print mode, the demonstration print mode continues until the power is turned off. Thus, the demonstration printing can be carried out as many times as required unless power is turned off. This is advantageous, for example, when consecutively performing demonstration printing for customers during sales activities.

Preferably, after setting the print mode to the demonstration print mode, the mode setting means continues to set the print mode to the demonstration print mode until one demonstration printing is finished.

According to this arrangement, after the print mode is set to the demonstration print mode, the demonstration mode is continued until one demonstration printing finished, which is advantageous when demonstration printing is desired to be performed only once.

BRIEF DESCRIPTION OF THE DRAWINGS

The above and other objects and the attendant features of this invention will become readily apparent by reference to the following detailed description when considered in conjunction with the accompanying drawings wherein:

FIGS. 5A to 5C are tables showing mode setting conditions according to the first embodiment of the present invention;

DETAILED DESCRIPTION OF THE PREFERRED EMBODIMENTS

A printing apparatus according to the first embodiment of the present invention is described in detail hereinbelow with reference to the attached drawings. In the present invention, there are provided two modes, one being a normal print mode and the other being a demonstration print mode. In the normal print mode, printing is performed based on print data received from a host computer. In the demonstration print mode, printing is performed based on demonstration print data (i.e., print data for use in demonstration printing in conducting a shipment inspection of a product and a sales activity). The printing apparatus sets a mode, depending on a print medium and/or a connection object, and when the mode is set to the demonstration print mode, the printing apparatus also performs printing based on the demonstration print data which is stored in the printing apparatus in advance. Therefore, demonstration printing can be easily performed without connection to the host computer.

Further, from this printing apparatus, a user interface which is operated by a user is eliminated and demonstration printing is performed by a specific operation serving as a trigger for printing. Therefore, by sharing the specific operation with another operation (for example, an operation of supplying power), the user does not need to carry out a special operation for printing (for example, depressing the print start key) and thus demonstration printing can be performed more easily. Description is made about an example of a label printing apparatus, which prints onto a tape-shaped print medium and cuts the print medium to have a predetermined length to create a label.

Figure 1:
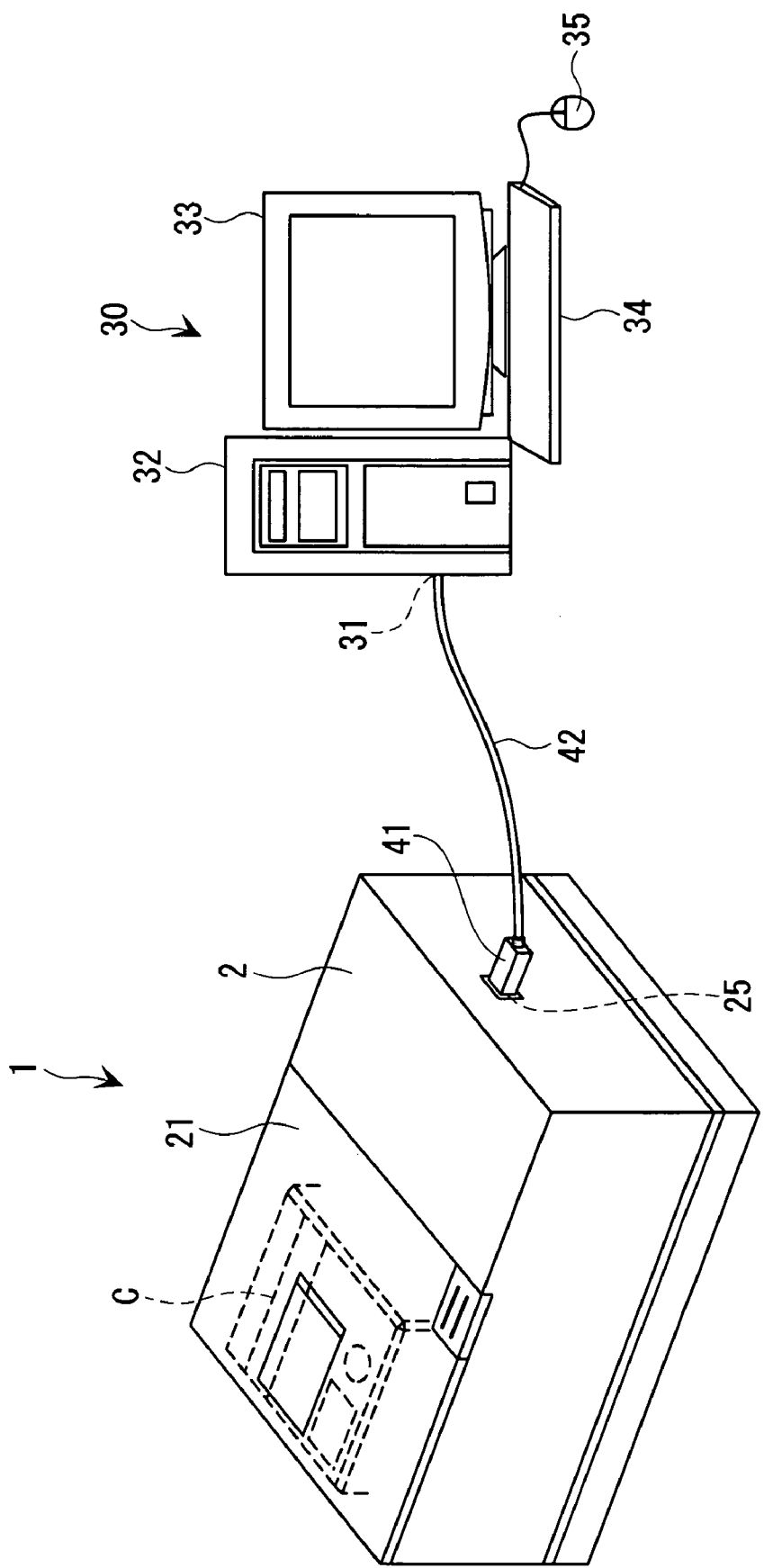
FIG. 1 is an external perspective view of a label writer with a lid closed according to a first embodiment of the present invention.
Figure 2:
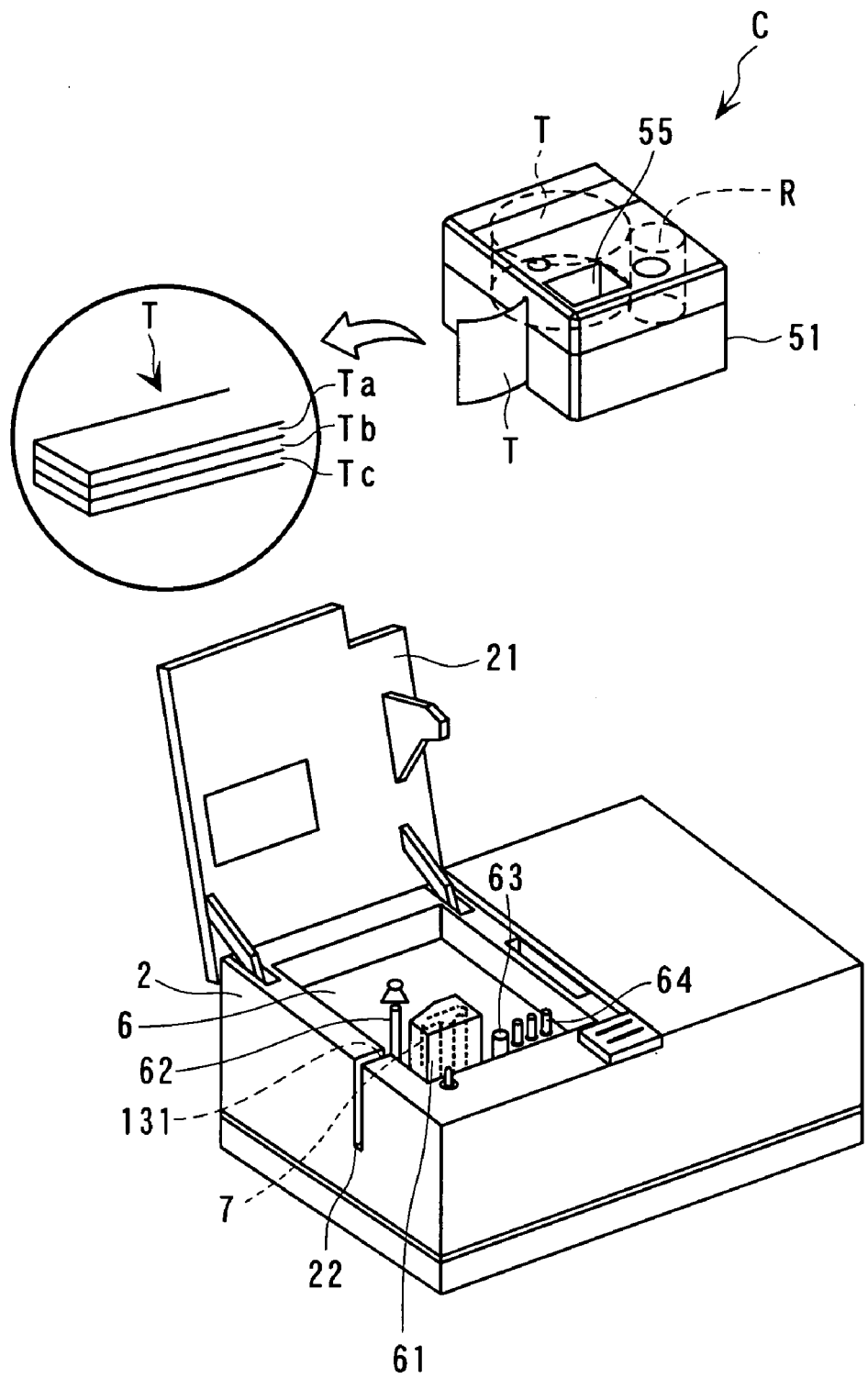
FIG. 2 is an external perspective view of the label writer with the lid open according to the first embodiment of the present invention.

FIG. 1 is an external perspective view of a label writer 1 in this embodiment, where a tape cartridge C is mounted and an opening/closing lid (lid member) is closed. FIG. 2 is an external perspective view of the label writer 1 where the tape cartridge C is detached and the opening/closing lid is open. As shown in both of the drawings, the label writer 1 of the present invention is connected to a host computer 30 through a cable 42 and a Universal Serial Bus (USB) connecter 41 and includes an opening/closing lid 21 which opens/closes when mounting/demounting the tape cartridge C, a pocket (tape cartridge mounting portion) 6 where the tape cartridge is mounted, a tape ejection opening 22 which deliver a tape T (print medium) reeled out from the tape cartridge C, a tape cutter 131 which cuts the printed tape T, and connection interface 25 (USB interface) (see FIG. 3) which receives print data and control data from the host computer 30. Moreover, as shown in the drawings, in the label writer 1 of the present invention, a user interface such as a key, a DIP switch, a button and a touch panel, is eliminated, for executing functions to carry out printing, to create and edit print data, thereby achieving a small and cost-saving construction.

In pocket 6, there are formed a head unit 61 made of a print head (thermal head) 7 and the like, a tape cartridge type detection sensor 142 made of microswitches 64, and drive axes 62 and 63 which are engaged with driven portions of the mounted tape cartridge C. The tape T and an ink ribbon R within the tape cartridge C are fed by the drive axes 62 and 63, and the print head 7 is driven synchronously with the tape T and the ink ribbon R, thereby performing printing.

Furthermore, in the tape cartridge C, the tape T and the ink ribbon R with a given width (about 3.5 mm to 48 mm) are wound and housed inside a cartridge case 51, and a through opening 55 is formed to insert a head unit 61 provided in the pocket 6 therethrough. In addition, a plurality of small holes (not shown) are provided on the back surface of the tape cartridge C in order to identify the type of the tape cartridge C (or the width and material of the tape T or the like) by the plurality of microswitches 64. In this embodiment, a mode is set to be either a normal print mode in which printing is performed based on the print data received from the host computer 30, in accordance with a detection result by these microswitches 64, or a demonstration print mode in which printing is performed based on the demonstration print data which is stored in advance. Details thereof will be described later.

The tape T has a construction in which an image-receiving layer (print surface) Ta, an adhesive layer Tb and a release paper layer Tc are layered. A created label is used by removing the release paper layer Tc and sticking the adhesive layer Tb onto an object for sticking. The tape T and the ink ribbon R move while overlapping each other at the position of the through opening 55, and only the tape T is delivered outside whereas the ink ribbon R is wound within the tape cartridge C.

The host computer 30 includes a main body 32 and peripherals such as a display 33, a keyboard 34, a mouse 35 and the like which are connected to the main body 32. The user operates using the keyboard 34, the mouse 35 and the like, and thereby the print data and control data are created and sent to the label writer 1 through a personal computer (PC) interface 31.

Figure 3:
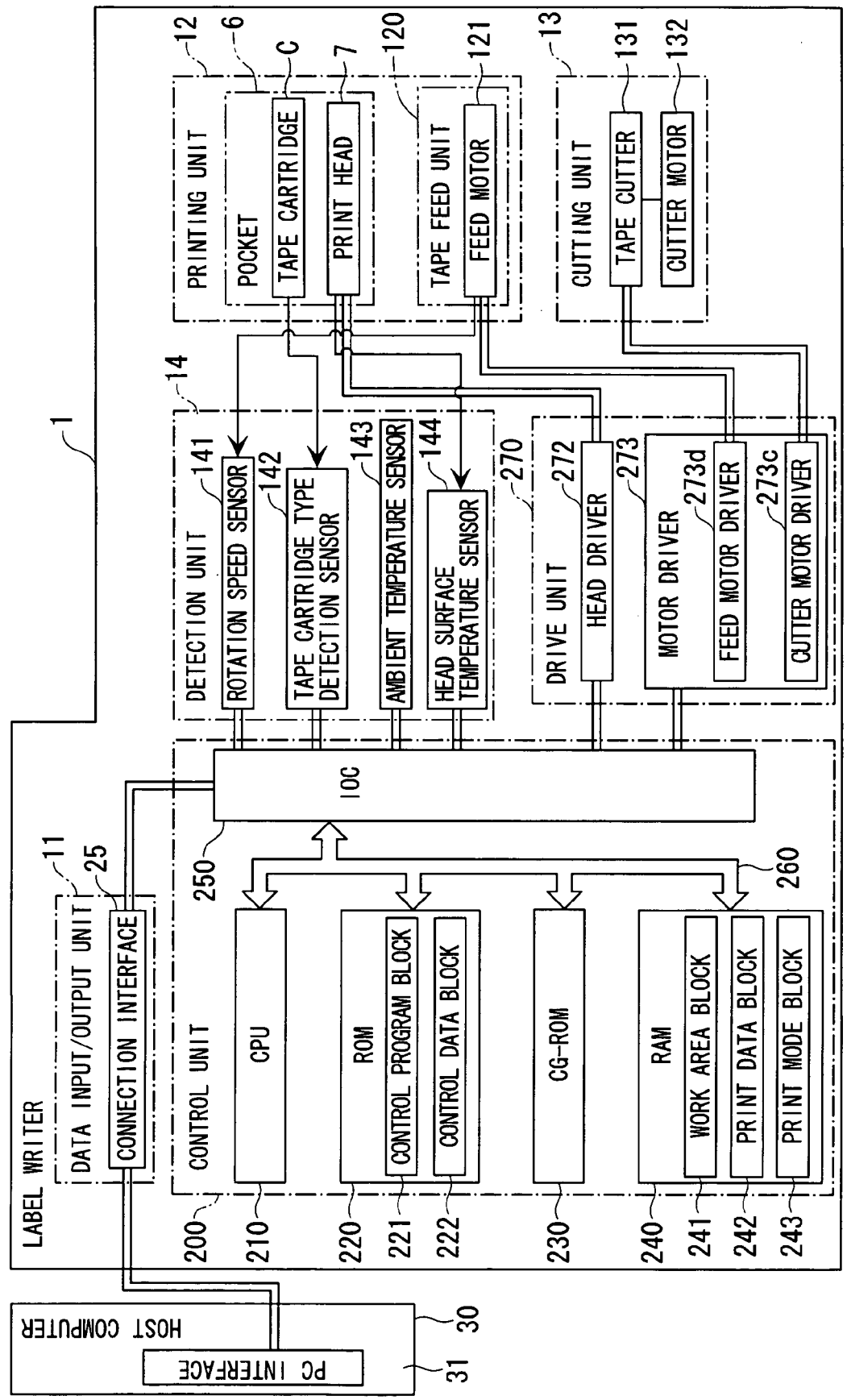
FIG. 3 is a control block diagram of the label writer according to the first embodiment of the present invention.

Here, a control configuration of the label writer 1 is described with reference to a control block diagram of FIG. 3. The label writer 1 includes a data input/output unit 11, a printing unit 12, a cutting unit 13, a detection unit 14, a drive unit 270 and a control unit 200. The data input/output unit 11 has the connection interface 25, inputs the print data and control data sent from the host computer 30 through the PC interface 31 and at the same time outputs data on processing situation or the like within the label writer 1 to the host computer 30. The printing unit 12 has a pocket 6 with cartridge C and a print head 7 arranged inside, and a tape feed unit 120 for conveying the tape T and the ink ribbon R using a feed motor 121, and performs printing on the tape T based on the print data sent from the host computer 30. The cutting unit 13 has a tape cutter 131 and a cutter motor 132 for driving the tape cutter 131 and cuts the printed tape T to have a predetermined length. The detection unit 14 has a rotation speed sensor 141 for detecting a rotation speed of the feed motor 121, a tape cartridge type detection sensor 142 for detecting the type of the tape cartridge C, an ambient temperature sensor 143 for detecting an ambient temperature (environment temperature) and a head surface temperature detection sensor 144 for detecting the surface temperature of the print head 7, and performs various detection. The drive unit 270 has head driver 272 and a motor driver 273 (feed motor driver 273d and a cutter motor driver 273c), and drives corresponding sections, respectively. The control unit 200 is connected each of the units and controls the entire label writer 1.

The control unit 200 has a central processing unit (CPU) 210, a read-only memory (ROM) 220, a character generator ROM (CG-ROM) 230, a random access memory (RAM) 240 and an input output controller (hereinafter, referred to as IOC) 250, and they are connected to each other through a internal bus 260. The ROM 220 has a control program block 221 and a control data block 222. The control program block 221 stores a control program to be processed in the CPU 210. The control data block 222 stores the control data which includes data regarding setting conditions (such as the type of tape cartridge C) for print mode setting and demonstration print data for use in performing demonstration printing. Further, font data such as special fonts and logotypes (picture writings) can be stored in the CG-ROM 230. When these special fonts and logo types are stored in the CG-ROM 230, if the code data which specifies a font or logotype is given, corresponding font data is outputted. The control unit may be arranged without this CG-ROM 230.

The RAM 240 is used as work area for control processing and has various work area blocks 241 used as flags and the like, a print data block 242 which stores print data sent from the host computer 30 and a print mode block 243 which stores the print mode which is set depending on the type of the tape cartridge C. In addition, the Ram 240 is always backed up so that data stored therein can be retained even if the power is turned off.

A logic circuit, which compensates for functions of the CPU 210 and is used for interface signals with various periphery circuits, is configured of a gate array, custom large scale integrated circuit (LSI) and the like and incorporated into the IOC 250. Thus, the IOC 250 fetches the print data and the control data from the host computer 30 as they are or after processing them, into the internal bus 260. At the same time, while interlocking with the CPU 210, the IOC 250 outputs data and control signals, which have been outputted from the CPU 210 to the internal bus 260, to the drive unit 270 as they are or after processing them.

Thereafter, the CPU 210 inputs various signals and data from each of the units within the label writer 1 through the IOC 250 in accordance with the control program within the ROM 220, processes the font data from the CG-ROM 230 and various signals and data within the RAM 240, and then outputs various signals and data to each of the units within the label writer 1 through the IOC 250. Consequently, the print mode (normal print mode or demonstration print mode) is set and print processing is controlled in accordance with the print mode.

Herein, methods of print mode setting and printing in the label writer 1 are described with reference to a flow chart in FIG. 4. As described earlier, the label writer 1 of the present invention includes two modes which are the normal print mode in which printing is performed based on the print data received from the host computer 30, and the demonstration print mode in which printing is performed based on the printing data for demonstration. The label writer 1 sets the print mode depending on the print medium and/or the connection object.

An example of mode setting is described regarding a case in which the print mode is set depending on the print medium (see FIG. 5A) and the mode setting condition is "set the print mode to the demonstration print mode when the specific type of tape cartridge is detected" (condition T-1). Various forms are considered with respect to an operation serving as a trigger for detection of the print medium and mode setting, an operation serving as a trigger for starting printing, and setting of time when the demonstration print mode ends. However, the operation serving as a trigger for detection of the print medium, mode setting and starting demonstration printing is set to be supply of power (power connection) by the user, and the time when the demonstration print mode ends is set to be time until one demonstration printing is performed (see FIG. 6: STEP 1=A, STEP 2=A and STEP 3=B). In the case of the present invention (STEP 1=A, STEP 2=A and STEP 3=B), it is required to load the print medium (here, the tape cartridge C) before power is supplied. (The preconditions in other examples will be described later.)

Figure 4:
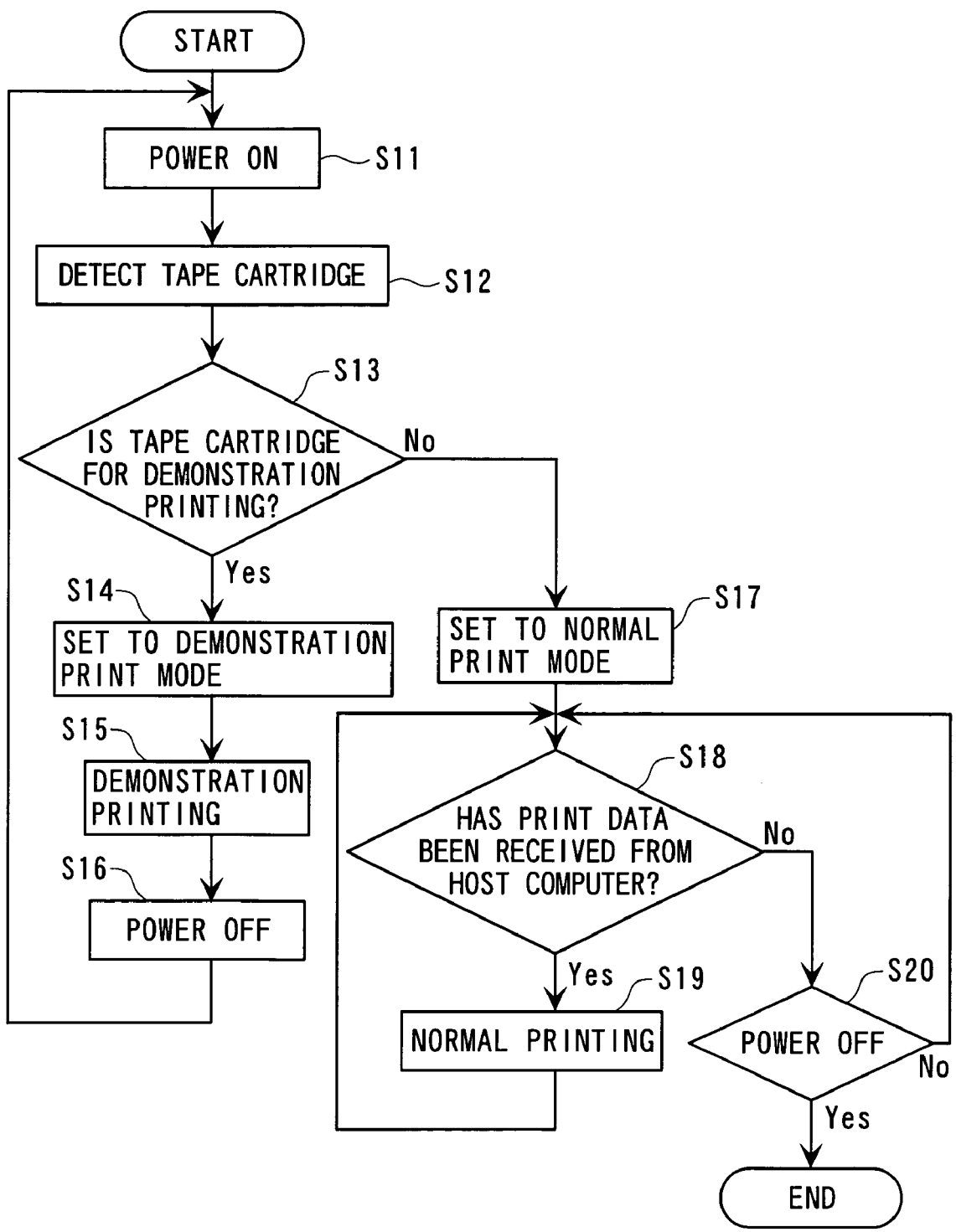
FIG. 4 is a flowchart showing a method of setting a print mode and a method of printing by the label writer according to the first embodiment of the present invention.

As shown in FIG. 4, once power for the label writer 1 is connected (ON) (S11), the microswitches 64 detect the type of tape cartridge C (S12). If the tape cartridge C is identified as the one for demonstration printing (S13: Yes), the print mode is set to the demonstration print mode (S14), and then demonstration printing is performed (S15). After demonstration printing is performed once, demonstration printing ends and power is automatically turned off (OFF) (S16). The label writer 1 then waits for the next supply of power. If the tape cartridge C is not identified as the one for demonstration printing (S13: No), the print mode is set to be the normal print mode (S17) and the label writer 1 waits to receive the print data from the host computer 30. When there is a desire for receiving the print data from the host computer 30 (S18: Yes), normal printing is performed (S19) based on the print data, and normal printing is performed every time the print data is received until the power is turned off (OFF) by the user (S18 to S20).

In this embodiment, loading of the print medium (tape cartridge C) before the supply of power is required as a precondition. This is because the print mode is set depending on the type of the tape cartridge C which is detected when power is supplied.

As described so far, according to the present invention, the type of the tape cartridge C (print medium) is detected and the print mode is set to be either the normal print mode or the demonstration print mode. When the print mode is set to the demonstration print mode, the printing is performed based on the demonstration print data which is stored in the ROM 220 or the like of the label writer 1 in advance. Accordingly, demonstration printing can be easily performed without connection to the host computer 30. In addition, detection of the type of the tape cartridge C, print mode setting and demonstration printing can be carried out based on the operation of supplying power, which is inevitable for the user to allow the label writer 1 to execute printing. Namely, special operations for mode setting and executing demonstration printing are not required, thus saving the user the trouble of carrying out these special operations. Further, since the type of the tape cartridge C in which the tape T itself is housed, is detected, the type of the print media can be easily detected compared with the case in which the type of the tape T itself is detected.

In this embodiment, a description was made of the case in which the mode setting condition is to "set the print mode to the demonstration print mode when the specific type of tape cartridge is detected" (see condition T-1 and S13 of FIG. 4). The mode setting condition may be "set the print mode to the normal print mode when the specific print medium (tape cartridge designated for normal printing) is detected" (condition T-2). In this case, data regarding the specific type of tape cartridge C which sets the print mode to the normal print mode is stored in the ROM 220 in advance, and the print mode is set to the normal print mode when the type of the tape cartridge C meets the specific type whereas the print mode is set to the demonstration print mode when the type of the print cartridge C does not meet the specific type.

Further, in this embodiment, the type of the tape cartridge C is detected. However, the type of the tape T (print medium) itself may be detected to set the print mode accordingly.

Figure 6:
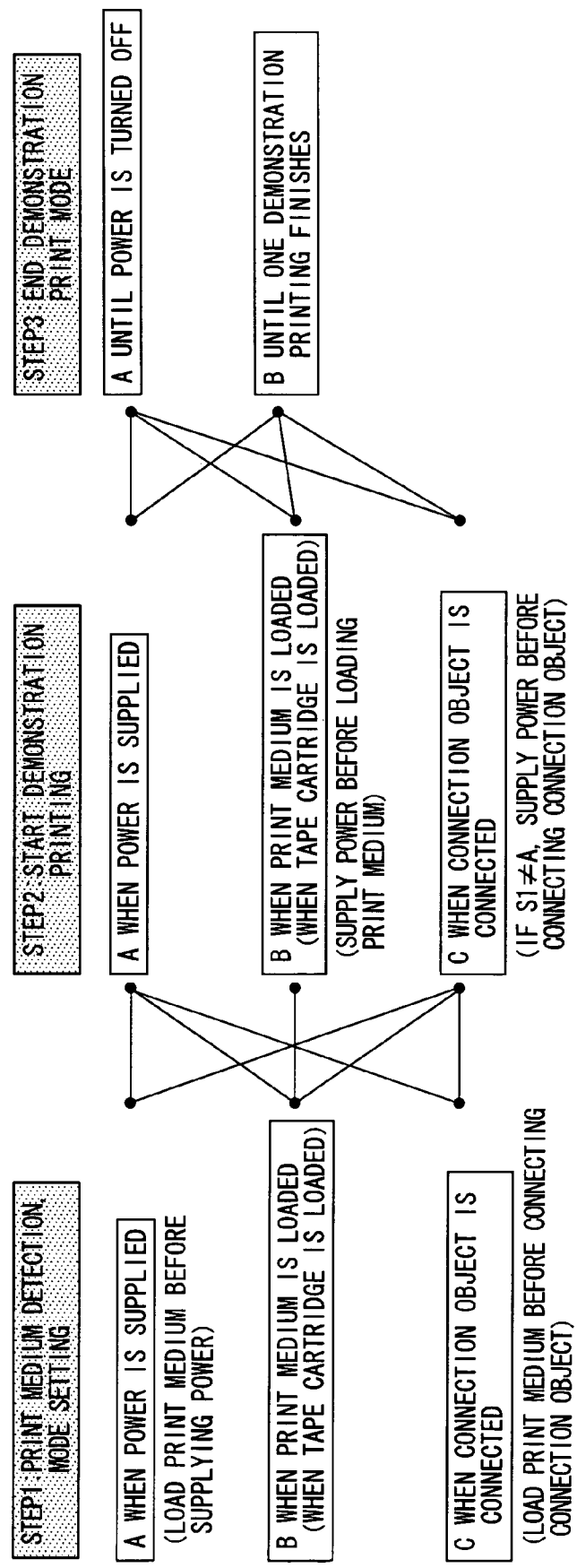
FIG. 6 is an explanatory view showing an operation form when a print mode is set depending on a print medium.

Here, a description will now be made about different forms of operation serving as a trigger for detecting the print medium (tape cartridge C) and mode setting (STEP 1), the operation serving as a trigger for starting the demonstration printing (STEP 2) and the setting of the time when the demonstration print mode ends (STEP 3), in the case of setting the print mode depending on the print medium as described in this embodiment. As shown in FIG. 6, multiple combinations of STEP 1 to STEP 3 can be made as the operation forms. However, in the case of the examples shown in this drawing, combinations of (STEP 1=A: time when power is supplied and STEP 2=B: time when the print medium is loaded) and (STEP 1=C: time when the connection object is connected and STEP 2=B: time when the print medium is loaded) do not exist. Here, the time when the connection object is connected is regarded as time when the connection object (the host computer 30 in the shown case) is connected to the connection interface 25 which is formed on a body case 2 of the label writer 1.

Further, when the operation STEP A is set to "A: time when power is supplied," the precondition is to load the print medium before supplying power. When the operation STEP 1 is set to "C: time when the connection object is connected," the precondition is to load the print medium before the connection object is connected.

Still furthermore, when the operations STEP 1 and STEP 2 are set to "B: time when the print medium is loaded (the tape cartridge is loaded)," the loading of the print medium is detected as the opening/closing lid 21 is closed in the case where the print medium is supplied using the tape cartridge C. Since loading of the tape cartridge C is detected by closing the opening/closing lid 21, the trigger therefor can be certainly detected in comparison with the case in which the loading of the tape T itself is detected. Here, when the lid 21 is closed while the tape cartridge C is mounted, it is determined that the tape cartridge C is loaded. When the lid 21 is closed while the tape cartridge C is not mounted, it is not determined that the tape cartridge C is loaded, as a matter of course.

Furthermore, when the operation STEP 2 is set to "B: time when the print medium is loaded," the precondition is to supply power before the print medium is loaded. When the operation STEP 2 is set to "C: time when the connection object is connected," the precondition is to supply power before the connection object is connected. This is because, without supply of power, print processing cannot be executed even when the operation which triggers the start of printing is carried out.

Moreover, in the case of the example shown in FIG. 6, when the operation STEP 3 is set to either "A: until the power is turned off" or "B: until one demonstration printing finishes," there are the following requirements. In order to repeat demonstration printing when the operations STEP 1 and STEP 2 are both set to A (STEP 1=A, STEP 2=A), a power source is required to be plugged in and out for each time of printing. Similarly, in order to repeat demonstration printing when the operations STEP 1 and STEP 2 are both set to B (STEP 1=B, STEP 2=B), the print medium is to be inserted and removed (the tape cartridge C is to be mounted and demounted). When the operations STEP 1 and STEP 2 are both set to C (STEP 1=C, STEP 2=C), the connection object (connector) is to be connected and disconnected.

The condition of the operation of ending demonstration printing (STEP 3) is not limited to those mentioned earlier and may be set to a condition "until predetermined times of demonstration printing finishes." In this case, the demonstration printing may be performed consecutively or every time when the operation to start printing is carried out. Namely, in the latter case, if the combination of the operations STEP 1 and STEP 2 is "STEP 1=A: when power is supplied and STEP 2=B: when the print medium is loaded," the demonstration printing is repeated by inserting and removing the print medium. Thereafter, after this operation is repeated for a predetermined time, the demonstration printing ends and, at the same time, the demonstration print mode is reset.

As set forth above, in the case of setting the print mode depending on the print medium, various combinations shown in FIG. 6 can be made as the form of the operation serving as a trigger for detection of the print medium (tape cartridge C) and mode setting (STEP 1), the operation serving as a trigger for starting the demonstration printing (STEP 2), and the setting of time when the demonstration printing ends (STEP 3).

Next, a description is made about a case in which the print mode is set under conditions other than the print medium (tape cartridge C) with reference to FIGS. 5A to 5C. As shown in the drawings, the mode setting condition includes not only the condition depending on the print medium (see FIG. 5A), but a condition depending on the connection object (see FIG. 5C) and a condition depending on the connection object and the print medium (see FIG. 5C). The description begins with the case of setting the print mode depending on the connection object.

The condition depending on the connection object is herein regarded as a condition depending on a type of object (host computer 30 in this case) to which the connection interface 25 (see FIG. 1) is connected. The type of connection object is detected by comparing a stored signal level and a signal level detected by connecting the connection interface 25.

Thereupon, three examples shown in FIG. 5B are described. When, for example, the mode setting condition is to "set the print mode to the demonstration print mode when the connection object is not the host computer or when there is no connection object" (condition C-1), the print mode is set to the normal print mode only when the connection object is detected as the host computer 30. Namely, this condition (condition C-1) corresponds to a condition of "set the print mode to the normal print mode when the connection object is the host computer" (condition C-3).

Figure 9:
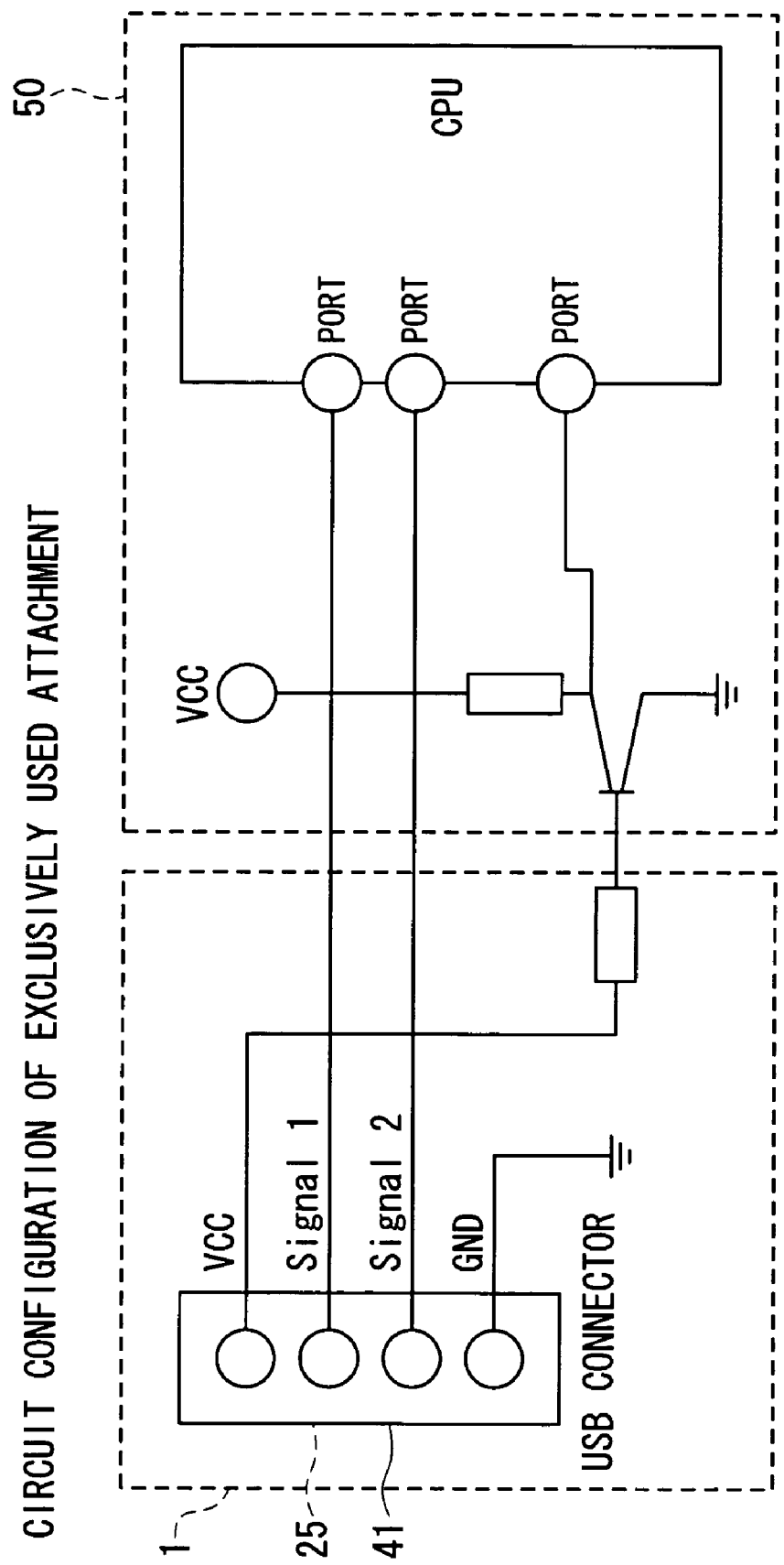
FIG. 9 is a circuit configuration of an attachment exclusively used for demonstration printing according to the first embodiment of the present invention.

Alternatively, when the mode setting condition is to "set the print mode to the demonstration print mode when the connection object is an attachment exclusively used for demonstration printing" (condition C-2), the print mode is set to the normal print mode when the connection object other than the attachment dedicated to the demonstration printing is detected. Here, a circuit configuration of the attachment exclusively used for demonstration printing 50 (hereinafter, referred to as an "exclusive attachment") is described with reference to FIG. 9. As shown in the drawing, upon connecting the exclusive attachment 50 to the connection interface 25 (USB connector 41), signal levels of Signal 1 and Signal 2 outputted from ports of the exclusive attachment 50 are detected, and the connection object is detected as the exclusive attachment 50. Therefore, when the mode setting condition is the condition C-2, the print mode is set to the normal print mode when the signal levels of Signal 1 and Signal 2 are different from predetermined signal levels stored (signal levels detected by the exclusive attachment).

The dedicated attachment may be replaced by a commercially available USB hub (self powered hub) or the like. According to this arrangement, it is feasible to realize a configuration for setting the print mode to the demonstration print mode with low cost.

Figure 7:
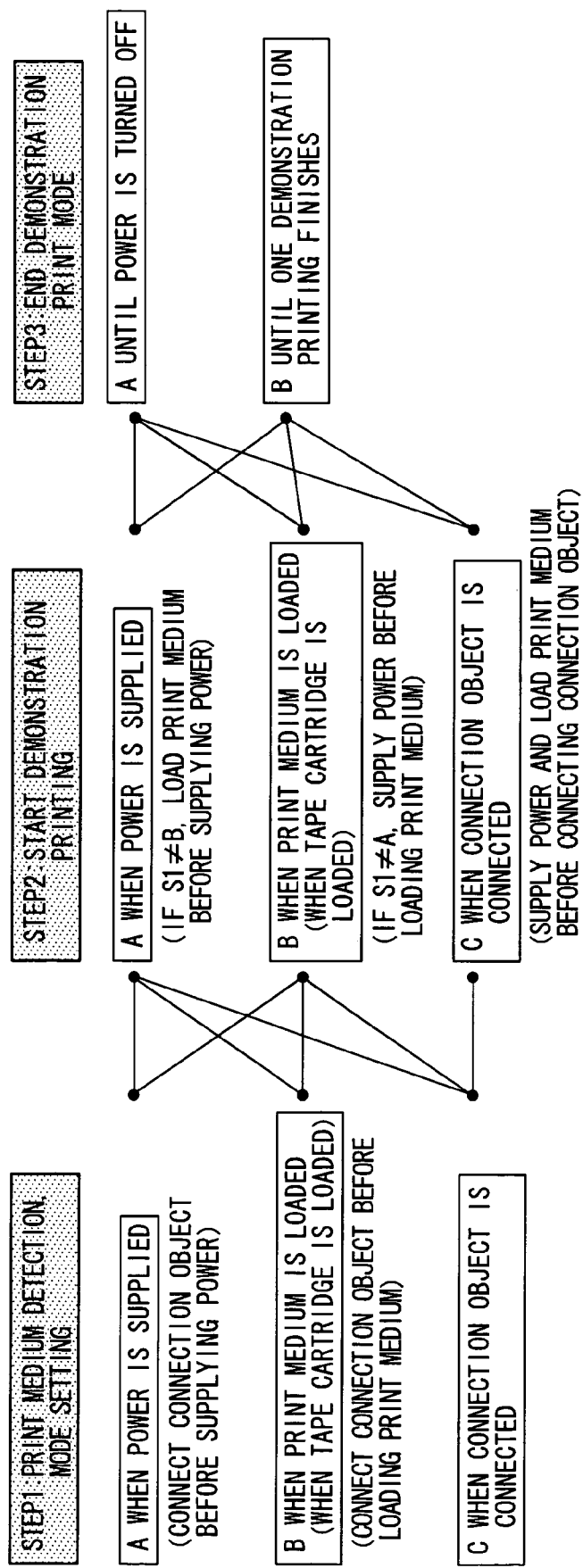
FIG. 7 is an explanatory view showing an operation form when the print mode is set depending on a connection object.

Here, a description will now be given about several forms of operation serving as a trigger for detection of the connection object and mode setting (STEP 1), the operation serving as a trigger for starting the demonstration printing (STEP 2), and setting of time when the demonstration printing ends (STEP 3). As shown in FIG. 7, multiple combinations of STEP 1 to STEP 3 can be made. However, in the case of the examples shown in the drawing, the combinations of (STEP 1=A: when power is supplied and STEP 2=C: when the connection object is connected) and (STEP 1=B: when the print medium is loaded and STEP 2=C: when the connection object is connected) do not exist.

In addition, when the operation STEP 1 is "A: when power is supplied," it is a precondition to connect the connection object before power is supplied. When the operation STEP 1 is "B: when the print media is loaded," it is a precondition to connect the connection object before loading the print medium. Furthermore, when the operation STEP 2 is "A: when power is supplied," and in the case where the operation STEP 1 is not B (STEP 1?B), it is a precondition to load the print medium before power is supplied.

Moreover, when the operation STEP 2 is "B: when the print medium is loaded," and in the case where the operation STEP 1 is not A (STEP 1?A), it is a precondition to supply power before loading the print medium. When the operation STEP 2 is "C: when the connection object is connected," preconditions are to supply power and load the print medium before connecting the connection object. This is because without supply of power and loading of the print medium, print processing cannot be executed even when the operation which triggers start of printing is carried out.

Similarly to the foregoing case where the print mode is set depending on the print medium (see FIG. 6), when the operation STEP 3 is either "A: when power is turned off" or "B: when one demonstration printing finishes," the following are required in order to repeat demonstration printing. When operation STEP 1 or STEP 2 is set to A, a power source is to be plugged in and out for each time of printing. When the operation STEP 1 or STEP 2 is set to B, the print medium is to be inserted and removed (the tape cartridge C is to be mounted and demounted). When the operation STEP 1 or STEP 2 is set to C, the connection object (connector) is to be connected and disconnected.

Next, a description will be made about the case in which the print mode is set depending on the connection object and the print medium (see FIG. 5C). In this case, when a specific condition is satisfied, any one of the conditions, the connection object and the print medium, is ignored. For example, when the mode setting condition is to "Set the print mode to the normal print mode when the connection object is the host computer irrespective of the loaded print medium" (condition CT-1), the print mode is set to the normal print mode even when, for example, the loaded print medium is exclusively used for demonstration printing. According to this arrangement, even if the user unintentionally loads the print medium not for exclusive use for the normal print mode, the demonstration printing is not executed against the user's will.

Further, when the mode setting condition is to "set the print mode to the demonstration print mode when the connection object is the attachment exclusively used for the demonstration printing irrespective of the loaded print medium" (condition CT-2), the print mode is set to the demonstration print mode even when, for example, the print medium for the normal print mode is loaded. According to this arrangement, demonstration printing can be performed even if the user unintentionally loads the print medium not exclusively used for demonstration printing in spite of the fact that the user wants to carry out demonstration printing.

Furthermore, when the mode setting condition is to "set the print mode to the demonstration print mode when the print medium is a specific print medium irrespective of the connection object" (condition CT-3), the print mode is set to the demonstration print mode even when, for example, the label writer 1 is connected to the host computer 30. According to this arrangement, demonstration printing can be performed even if the user unintentionally connects the label writer 1 to the host computer 30 in spite of the fact that the user wants to carry out demonstration printing.

Figure 8:
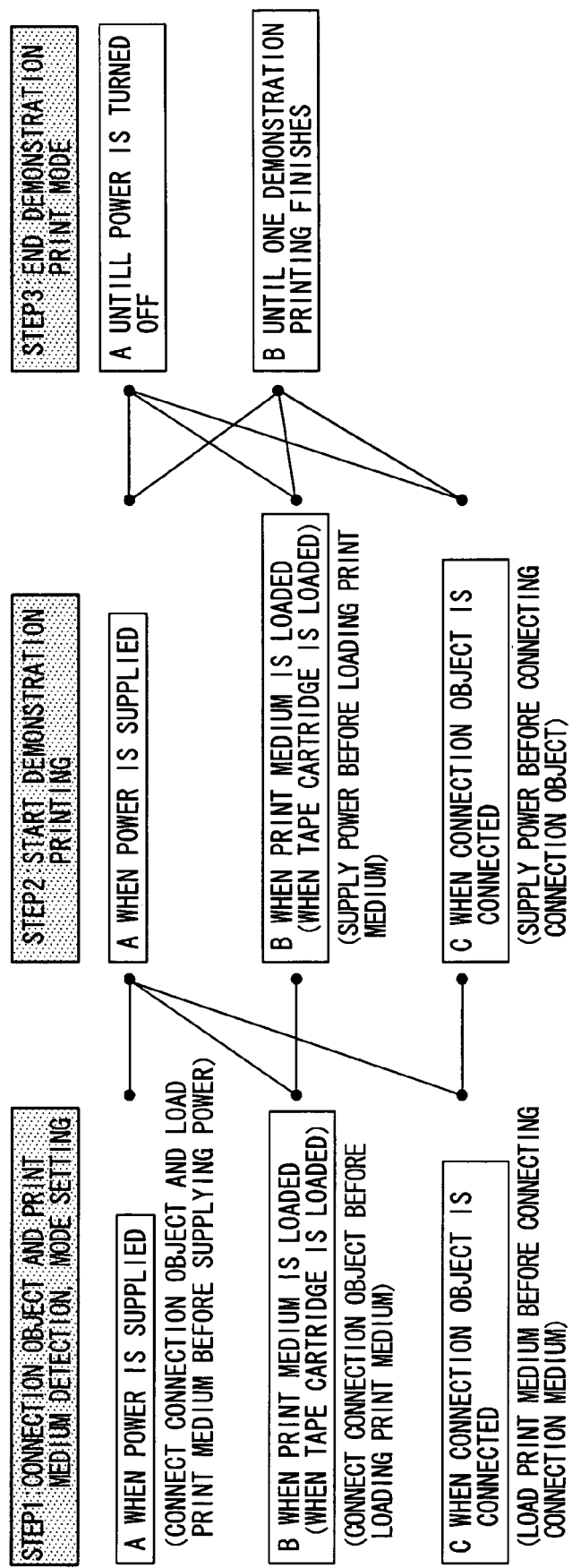
FIG. 8 is an explanatory view showing an operation form when the print mode is set depending the connection object and the print medium.

Here, a description will be given about several forms of operation serving as a trigger for detection of the connection object and the print medium (tape cartridge C) (STEP 1), the operation serving as a trigger for starting demonstration printing (STEP 2), and setting of time when the demonstration printing ends, in the case of setting the print mode depending on the connection object and the print medium. As shown in FIG. 8, multiple combinations of STEP 1 to STEP 3 can be made. However, in the case of the examples shown in this drawing, combination of (STEP 1=A: when power is supplied and STEP 2=B: when the print medium is loaded), (STEP 1=A: when power is supplied and STEP 2=C: when connection object is connected), (STEP 1=B: when the print medium is loaded and STEP 2=C: when the connection object is connected), and (STEP 1=C: when connection object is connected and STEP 2=B: when the print medium is loaded) do not exist.

Moreover, when the operation STEP 1 is "A: when power is supplied," preconditions are to connect the connection object and to load the print medium before supplying power. When the operation STEP 1 is "B: when the print medium is loaded," the precondition is to connect the connection object before loading the print medium. Additionally, when the operation STEP 1 is "C: when the connection object is connected," a precondition is to load the print medium before connecting the connection object.

Further, when the operation STEP 2 is "B: when the print medium is loaded," a precondition is to supply power before loading the print medium. When the operation STEP 2 is "C: when the connection object is connected," the precondition is to supply power before connecting the connection object. In addition, similarly to the foregoing case where the print mode is set depending on the print medium or the connection object (see FIGS. 6 and 7), when the operation STEP 3 is either "A: when power is turned off" or "B: when one demonstration printing finishes," the following are required in order to repeat the demonstration printing. When operation STEP 1 or STEP 2 is set to A, a power source is to be plugged in and out for each time of printing. When operation STEP 1 or STEP 2 is set to B, the print medium is to be inserted and removed (the tape cartridge C is to be mounted and demounted). When operation STEP 1 or STEP 2 is set to C, the connection object (connector) is to be connected and disconnected.

As set forth in the foregoing, the label writer 1 of the present invention has two modes which are the normal print mode for performing printing based on the print data received from the host computer 30 and the demonstration print mode for performing printing based on the demonstration print data. In this label printing apparatus, the print mode is set depending on the print medium and/or the connection object. In addition, when the print mode is set to the demonstration print mode, printing is performed based on the demonstration print data which is stored in the label writer in advance. Thus, the label writer 1 can perform the demonstration printing easily without being connected to the host computer 30.

Moreover, in this label printing apparatus 1, the user interface to be used by the user is eliminated, and a specific operation is used as a trigger to execute the demonstration printing. Therefore, by sharing the specific operation for an operation for executing printing (for example, an operation of supplying power), the user does not need to carry out a special operation for printing and mode setting (for example, depression of a print start key) and thus demonstration printing can be performed more easily. Furthermore, since the label writer can be constructed without the user interface, cost reduction can be achieved.

Next, a second embodiment is described with reference to FIGS. 10 to 12. In the first embodiment described above, the label writer 1 without the user interface is described as an example. In this embodiment, a CD-R printing apparatus 301 having a print start key 310 as a user interface is described as an example. The CD-R printing apparatus 301 is a device for printing characters such as a title of the CD and an image, created in the host computer 30, onto the CD-R (print medium).

Figure 10:
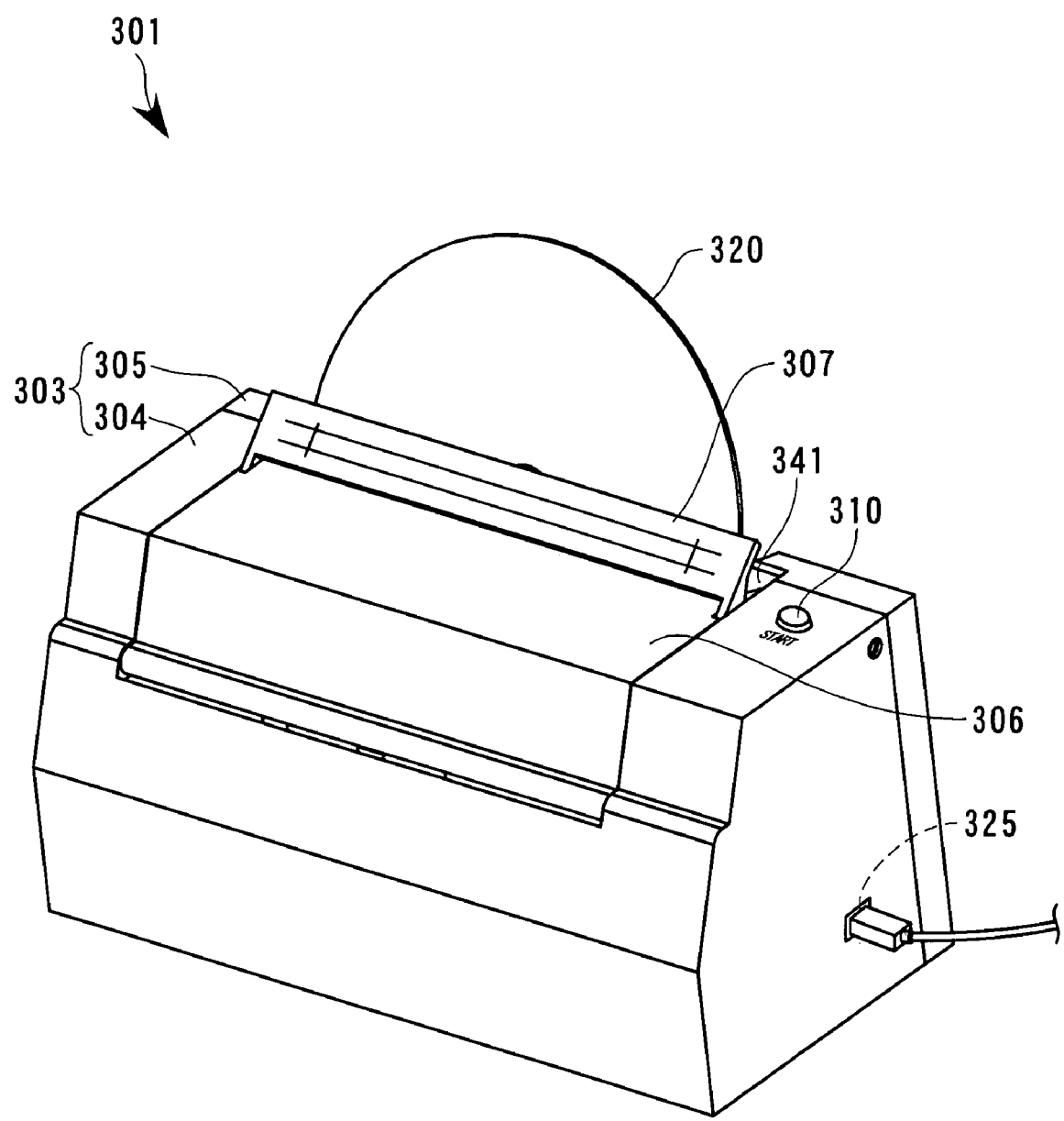
FIG. 10 is an external perspective view of a CD-R writer with a print medium inserted thereto, according to a second embodiment of the present invention.
Figure 11:
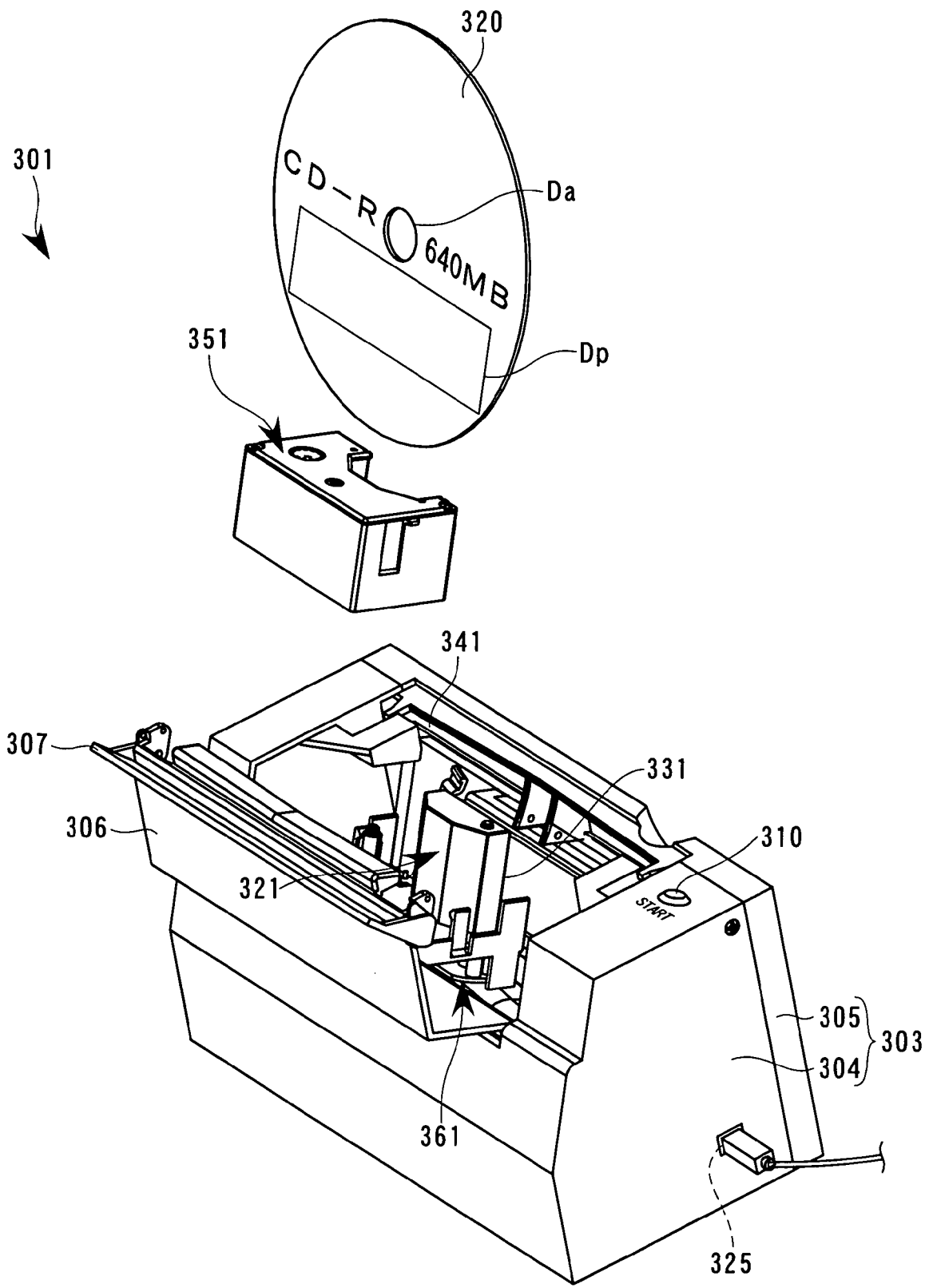
FIG. 11 is an external perspective view of the CD-R writer, a ribbon cartridge and a storage medium according to the second embodiment of the present invention.

FIG. 10 is an external perspective view of the CD-R printing apparatus 301 in this embodiment in a state where the CD-R 320 is set therein. FIG. 11 is an external perspective view of the CD-R printing apparatus 320, a ribbon cartridge 351 to be mounted thereto, and the CD-R 320. As shown in both drawings, the CD-R printing apparatus 301 is completely covered with a cover case 303 including a front case 304 and rear case 305. In the front case 304, provided are a front cover 306 which is opened frontward in the drawing, an opening/closing lid 307 which clicks when it is opened/closed, a connection interface 325 (USB interface) which is connected to a host computer 30 through a cable and a USB connector. In addition, on the top surface of the CD-R printing apparatus 301, an insertion slot 341 and a print start key 310. The insertion slot 341, which is located on the boundary between the front case 304 and the rear case 305, is for inserting the CD-R 320 into the printing apparatus body. The print start key 310 is for executing demonstration printing. By depressing the print start key 310, the detection of loading of the CD-R 320 (print medium), setting of a print mode and the demonstration printing are performed. The details thereof will be described later.

Provided inside the printing apparatus are a head unit 321 having a print head 331 (thermal head), a ribbon cartridge 351 facing the print head-331, and a carriage 361 which mounts the print head 331 and the ribbon cartridge 351 thereon, which can be seen when the front cover 306 is opened. As the carriage 361 is moved, printing is performed onto a predetermined print area Dp of the DC-R 302 set in the printing apparatus.

In the CD-R 320, a circular clamp opening Da is formed at the center thereof. The front side of the CD-R 320 in the drawing is the print surface and the back surface thereof is the recording surface in which various data such as music data is written. In general, a name of a manufacturer or the product name is printed on the CD-R 320 in advance, and they define directions of the CD-R 320, that is, right to left as well as up and down. Further, a lower area of the disc which does not overlap with the names of the manufacturer and the product is set as the print area Dp.

Here, a method of setting the print mode and printing in the CD-R printing apparatus 301 is described with reference to a flow chart in FIG. 12. Similarly to the label writer 1 of the foregoing first embodiment, the CD-R printing apparatus 301 of the present invention has two modes, which are a normal print mode for printing based on print data received from the host computer 30 and a demonstration print mode for printing based on the demonstration print data.

Here, a description will now be made about an example case in which the print mode is set depending on a connection object (see FIG. 5B) under a mode setting condition to "set the print mode to the demonstration print mode when the connection object is not the host computer or there is no connection object" (condition C-1). Similarly to the first embodiment, various forms are considered with respect to an operation serving as a trigger for detection of the connection object and mode setting, an operation serving as a trigger for starting printing, and setting of time when the demonstration printing ends. Herein, once the print start key 310 is depressed, detection of loading the CD-R 320 (print medium), print mode setting, and the demonstration print processing are executed. As for the setting of time, the setting of when the demonstration print mode is to end is explained using an example case where the demonstration print mode ends after one demonstration printing is performed. In the case of this embodiment, it is required to load the CD-R 320 and to supply power before depressing the print start key 310.

Figure 12:
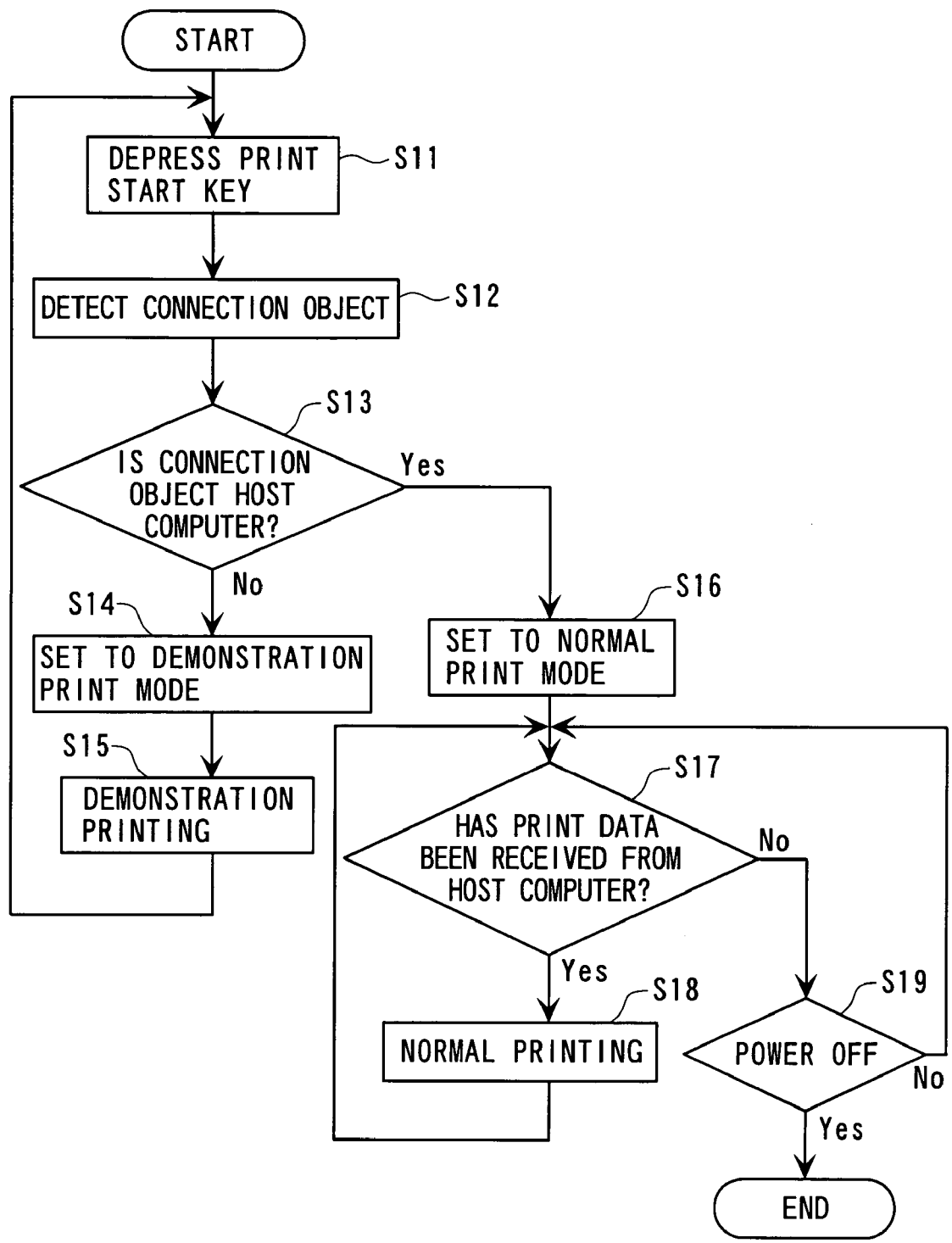
FIG. 12 is a flow chart showing a method of setting a print mode and a method of printing of the CD-R writer according to the second embodiment of the present invention.

As shown in FIG. 12, once the print start key 310 is depressed by a user (S11), the connection object which is connected to the connection interface 25 is detected (S12). When it is determined that the connection object is the host computer 30 (S13: Yes), the print mode is set to the normal print mode (S16). On the other hand, when it is determined that the connection object is not the host computer 30 (S13: No), the print mode is set to the demonstration mode (S14), and then demonstration printing is performed (Sl5). Once one the demonstration printing ends, the demonstration printing is completed and the printing apparatus waits for the next depression of the print start key.

As described above, when it is determined that the connection object is the host computer 30 (S13: Yes), the print mode is set to the normal print mode. Thereafter, when the print data from the host computer 30 is received (S17: Yes), normal printing is performed based on the print data (S18), and the normal printing is consecutively performed for each print data received (S17 to 19) until power is turned off (OFF) by the user.

In this embodiment, there is a precondition to have the CD-R 320 loaded before depressing the print start key. This is because printing cannot be performed if the CD-R 320 is not loaded when starting the printing.

As described above, according to the present invention, the print media is detected and the print mode is set once the user depresses the print start key 310. Thus, the user does not set the print mode by an erroneous operation (for example, an operation of supplying power) which user does not intend to carry out. Therefore, erroneous operations by the user can be reduced. Further, detection of the connection object, mode setting and the demonstration printing are performed by depressing the print start key 310. Thus, the user can carry out these processes easily by one depression of the key.

In this embodiment, the mode setting conditions shown in FIGS. 5A to 5C can be applied. Therefore, as shown in FIGS. 6 to 8, it is possible to apply similar forms of operation serving as a trigger for detection of the print medium and mode setting (STEP 1), the operation serving as a trigger for starting demonstration printing (STEP 2), and setting of time when the demonstration print mode ends (STEP 3).

Further, the present invention can be applied not only to the CD-R printing apparatus.301, but to a device which performs printing on a discoid write-once optical disk such as a CD-RW, a DVD-R, a DVD-RAM and the like.

As set forth in the first and second embodiment, with the printing apparatus (label writer 1 and CD-R writer 301) of the present invention, the following advantages can be obtained. When the print mode is set depending on the print medium and/or the connection object, and the print mode is set to the demonstration printing (in the first embodiment), printing is performed based on the demonstration print data which is stored within the printing apparatus in advance. Thus, the printing apparatus can perform demonstration printing easily without being connected to the host computer 30. In addition, even if the printing apparatus is not provided with a user interface which is to be operated by the user, demonstration printing can be performed by a specific operation serving as a trigger. Therefore, by sharing the specific operation with another operation (for example, an operation of supplying power), the user does not need to carry out a special operation for printing (for example, depression of the print start key) and thus demonstration printing can be performed more easily. Further, since the printing apparatus can have a construction not including the user interface, a cost reduction can be achieved.

With the construction having a print start key 310 (in the second embodiment), a series of operations for executing demonstration printing (detection of the connection object, mode setting and executing demonstration printing) can be carried out by one depression of a key, saving the user the trouble of carrying out those operations. In addition, since the user is required to intentionally operate the print start key 310, the user does not set the print mode by an erroneous operation which the user does not intend to carry out (for example, the operation of supplying power). Thus, the mode setting can be certainly carried out.

In the foregoing examples, the connection interface 25 is the USB interface, but may be any kinds of interfaces including a serial interface, a SCSI interface, Centronics interface, and the like.

Further, in the foregoing example (the first embodiment), the demonstration print data is stored in the ROM 220. However, the printing apparatus can have a construction in which the demonstration print data may be stored in the RAM 240 so that the data can be re-written as necessary from the host computer 30 or the like. According to this arrangement, suitable demonstration printing can be carried out for each purchaser (store) during sales activities. In addition, not only one kind of demonstration print data, but plural kinds of the same may be stored. In this case, plural kinds of the demonstration print data may be sequentially outputted for each print instruction, or may be randomly outputted. According to this arrangement, a variety of demonstration printing can be performed.

Further, in the foregoing examples, the print mode is set immediately after the detection of the print medium, but may be set by different triggers, respectively. Namely, the printing apparatus may have a construction where the print medium is detected when power is supplied, the print mode is set when the print medium is loaded, and thereafter, the demonstration printing is started when the connection object is connected. Note that, in this case, it is a precondition that these operations are preceded in the above-mentioned order.

Furthermore, the printing apparatus is not limited to the aforementioned examples of the label writer and the CD-R printing apparatus, and, for example, the print system and the construction of the printing apparatus may be changed as appropriate without departing from the gist of the present invention.

As described in the foregoing, it is advantageous in that the printing apparatus of the present invention can perform demonstration printing easily without connection to an external device such as the host computer.

What is claimed is:

1. A printing apparatus which performs printing based on print data sent from a host computer and in which a user interface to be operated by a user is eliminated, comprising:
   a connection interface which connects the printing apparatus to a peripheral device including the host computer;
   connection object detection means for detecting a connection object of the connection interface;
   mode setting means for setting a print mode to one of a normal print mode in which printing is performed based on the print data sent from the host computer, and a demonstration print mode in which printing is performed based on demonstration print data which is stored in advance; and
   demonstration printing means for performing demonstration printing on a print medium with a specific operation by the user serving as a trigger therefor when the print mode is set to the demonstration print mode,
   wherein the specific operation does not require operation of a user interface or button,
   wherein the mode setting means sets the print mode to the normal print mode when the connection object is the host computer and to the demonstration print mode when the connection object is not the host computer or there is no connection object, and
   wherein the connection object detection means detects the connection object when the print medium is loaded.

2. The printing apparatus according to claim 1, wherein the connection object detection means detects the connection object when power is supplied.

3. The printing apparatus according to claim 1, wherein the connection object detection means detects the connection object when the connection object is connected.

4. The printing apparatus according to claim 1, wherein the mode setting means sets the print mode to the demonstration print mode when the connection object is an attachment exclusively used for the demonstration printing.

5. The printing apparatus according to claim 1, wherein the specific operation includes an operation of supplying power.

6. The printing apparatus according to claim 1, wherein the specific operation includes an operation of connecting the connection object.

7. The printing apparatus according to claim 1, wherein the print medium is a tape, further comprising:
   a tape cartridge mounting portion for mounting a tape cartridge having housed therein the tape in a state of being wound,
   wherein the tape cartridge mounting portion has a lid member which is for closing after the tape cartridge is mounted, and
   wherein the connection object detection means detects the connection object when the lid member is closed.

8. The printing apparatus according to claim 7, wherein the specific operation includes an operation of closing the lid member.

9. The printing apparatus according to claim 1, wherein the print medium is a discoid write-once optical disk.

10. The printing apparatus according to claim 1, wherein, after setting the print mode to the demonstration print mode, the mode setting means continues to set the print mode to the demonstration print mode until the power is turned off.

11. The printing apparatus according to claim 1, wherein, after setting the print mode to the demonstration print mode, the mode setting means continues to set the print mode to the demonstration print mode until one demonstration printing is finished.

12. A printing apparatus which performs printing based on print data sent from a host computer and in which a user interface to be operated by a user is eliminated, comprising:
   a connection interface which connects the printing apparatus to a peripheral device including the host computer;
   connection object detection means for detecting a connection object of the connection interface;
   mode setting means for setting a print mode to one of a normal print mode in which printing is performed based on the print data sent from the host computer, and a demonstration print mode in which printing is performed based on demonstration print data which is stored in advance; and
   demonstration printing means for performing demonstration printing on a print medium with a specific operation by the user serving as a trigger therefor when the print mode is set to the demonstration print mode, wherein the specific operation does not require operation of a user interface or button,
   wherein the mode setting means sets the print mode to the normal print mode when the connection object is the host computer and to the demonstration print mode when the connection object is not the host computer or there is no connection object, and
   wherein the specific operation includes an operation of loading the print medium.

13. A printing apparatus which performs printing based on print data sent form a host computer, comprising:
   print medium detection means for detecting a type of a print medium loaded on the printing apparatus;
   mode setting means for setting a print mode to one of a normal print mode in which printing is performed based on the print data sent from the host computer, depending on the detected type of the print medium, and a demonstration print mode in which printing is performed based on demonstration print data which is stored in advance;
   demonstration printing means for performing demonstration printing on the print medium with a specific operation by a user serving as a trigger therefor when the print mode is set to the demonstration print mode, wherein the specific operation does not require operation of a user interface or button, and
   a print start key by which the user instructs execution of printing, wherein the print medium detection means detects the print medium when the print start key is depressed by the user.

14. The printing apparatus according to claim 13, wherein the print medium detection means detects the print medium when power is supplied.

15. The printing apparatus according to claim 13, wherein a user interface to be operated by a user is eliminated.

16. The printing apparatus according to claim 13, wherein the specific operation includes an operation of depressing the print start key.

17. The printing apparatus according to claim 13, wherein the specific operation includes an operation of supplying power.

18. The printing apparatus according to claim 13, wherein the print medium is a discoid write-once optical disk.

19. The printing apparatus according to claim 13, wherein, after setting the print mode to the demonstration print mode, the mode setting means continues to set the print mode to the demonstration print mode until the power is turned off.

20. The printing apparatus according to claim 13, wherein, after setting the print mode to the demonstration print mode, the mode setting means continues to set the print mode to the demonstration print mode until one demonstration printing is finished.

21. A printing apparatus which performs printing based on print data sent form a host computer, comprising:
   print medium detection means for detecting a type of a print medium loaded on the printing apparatus;
   mode setting means for setting a print mode to one of a normal print mode in which printing is performed based on the print data sent from the host computer, depending on the detected type of the print medium, and a demonstration print mode in which printing is performed based on demonstration print data which is stored in advance; and
   demonstration printing means for performing demonstration printing on the print medium with a specific operation by a user serving as a trigger therefor when the print mode is set to the demonstration print mode, wherein the specific operation does not require operation of a user interface or button, and
   wherein the specific operation includes an operation of loading the print medium.

22. A printing apparatus which performs printing based on print data sent form a host computer, comprising:
   print medium detection means for detecting a type of a print medium loaded on the printing apparatus, wherein the print medium is a tape,
   mode setting means for setting a print mode to one of a normal print mode in which printing is performed based on the print data sent from the host computer, depending on the detected type of the print medium, and a demonstration print mode in which printing is performed based on demonstration print data which is stored in advance;
   demonstration printing means for performing demonstration printing on the print medium with a specific operation by a user serving as a trigger therefor when the print mode is set to the demonstration print mode, wherein the specific operation does not require operation of a user interface or button; and
   a tape cartridge mounting portion for mounting a tape cartridge having housed therein the tape in a state of being wound,
   wherein the tape cartridge mounting portion has a lid member which is for closing after the tape cartridge is mounted, and
   wherein the print medium detection means detects the type of the tape cartridge when the lid member is closed, and wherein the print medium detection means detects the print medium when the print medium is loaded.

23. The printing apparatus according to claim 22, wherein the specific operation includes an operation of closing the lid member.

24. A printing apparatus which performs printing based on print data sent form a host computer, comprising:
   print medium detection means for detecting a type of a print medium loaded on the printing apparatus;
   mode setting means for setting a print mode to one of a normal print mode in which printing is performed based on the print data sent from the host computer, depending on the detected type of the print medium, and a demonstration print mode in which printing is performed based on demonstration print data which is stored in advance;
   demonstration printing means for performing demonstration printing on the print medium with a specific operation by a user serving as a trigger therefor when the print mode is set to the demonstration print mode, wherein the specific operation does not require operation of a user interface or button;
   a connection interface which connects the printing apparatus to a peripheral device including the host computer; and
   connection object detection means for detecting a connection object of the connection interface,
   wherein, when the connection object is the host computer, the mode setting means sets the print mode to the normal print mode irrespective of the loaded print medium, and
   wherein, when the print medium detected by the print medium detection means is a specific print medium, the mode setting means sets the print mode to the demonstration print mode irrespective of the connection object detected by the connection object detection means.

25. The printing apparatus according to claim 24, wherein, when the connection object detected by the connection object detection means is an attachment exclusively used for demonstration printing, the mode setting means sets the print mode to the demonstration print mode irrespective of the loaded print medium.

26. The printing apparatus according to claim 24, wherein the specific operation includes an operation of connecting the connection object.

* * * * *